United States Patent
Krase et al.

(10) Patent No.: US 9,328,602 B2
(45) Date of Patent: May 3, 2016

(54) MWD SYSTEM FOR UNCONVENTIONAL WELLS

(71) Applicant: Ryan Directional Services, Inc., Houston, TX (US)

(72) Inventors: Stephen Krase, Spring, TX (US); Peter Harvey, Tampa, FL (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 14/604,249

(22) Filed: Jan. 23, 2015

(65) Prior Publication Data

US 2015/0211355 A1 Jul. 30, 2015

Related U.S. Application Data

(60) Provisional application No. 61/931,289, filed on Jan. 24, 2014.

(51) Int. Cl.
| | |
|---|---|
| *G01V 5/00* | (2006.01) |
| *E21B 47/00* | (2012.01) |
| *G01V 5/04* | (2006.01) |
| *E21B 47/12* | (2012.01) |
| *E21B 44/00* | (2006.01) |

(52) U.S. Cl.
CPC .................. *E21B 47/00* (2013.01); *E21B 44/00* (2013.01); *E21B 47/12* (2013.01); *G01V 5/04* (2013.01)

(58) Field of Classification Search
CPC ......... E21B 47/00; E21B 47/09; G01V 5/125; G01V 5/04; G01V 5/12
See application file for complete search history.

(56) References Cited

U.S. PATENT DOCUMENTS

| | | | | |
|---|---|---|---|---|
| 4,698,501 | A | * | 10/1987 | Paske ............................ 250/265 |
| 5,881,310 | A | * | 3/1999 | Airhart et al. ...................... 710/3 |
| 6,529,834 | B1 | | 3/2003 | Estes et al. |
| 7,195,062 | B2 | | 3/2007 | Cairns et al. |
| 2004/0090234 | A1 | * | 5/2004 | Macune ......................... 324/337 |
| 2006/0017443 | A1 | * | 1/2006 | Folberth et al. ............... 324/338 |
| 2006/0020390 | A1 | | 1/2006 | Miller |
| 2006/0044156 | A1 | * | 3/2006 | Adnan et al. ............... 340/854.9 |
| 2008/0275648 | A1 | * | 11/2008 | Illfelder ........................... 702/7 |
| 2009/0078462 | A1 | * | 3/2009 | Boone et al. .................... 175/26 |
| 2009/0078467 | A1 | * | 3/2009 | Castillo ......................... 175/249 |

(Continued)

FOREIGN PATENT DOCUMENTS

WO 2015112871 A1 7/2015

OTHER PUBLICATIONS

International Search Report from PCT/US2015/12702 dated Apr. 30, 2015 from 1187-P014-PCT, 1 page.

*Primary Examiner* — Kiho Kim
(74) *Attorney, Agent, or Firm* — Enrique Abarca; Abel Law Group, LLP

(57) ABSTRACT

An improved MWD system for drilling unconventional wells. Embodiments provide a particular combination of sensors in a specific arrangement in order to provide a system expressly designed for drilling unconventional wells. By minimizing modularity to reduce the need for redundant/duplicated components, including only sensors specifically needed for unconventional wells, and by separating long-life components such as sensors from components requiring more frequent maintenance or service such as batteries, the components can be more efficiently combined into a BHA sensor assembly having the shortest possible length.

16 Claims, 6 Drawing Sheets

(56) References Cited

U.S. PATENT DOCUMENTS

2009/0159337 A1* 6/2009 Alberty ............................ 175/48
2009/0294174 A1* 12/2009 Harmer et al. ................... 175/45
2010/0018770 A1* 1/2010 Moriarty et al. ................. 175/45
2010/0078216 A1* 4/2010 Radford et al. ................. 175/40
2010/0089645 A1 4/2010 Trinh et al.
2013/0248247 A1 9/2013 Sugiura

* cited by examiner

MWD SYSTEM FOR UNCONVENTIONAL WELLS

CROSS-REFERENCE TO RELATED APPLICATION(S)

This application claims priority under 35 U.S.C. §119(e) to U.S. Patent Application No. 61/931,289 entitled "MWD System for Unconventional Wells," by Stephen Krase and Peter Harvey, filed Jan. 24, 2014, which is assigned to the current assignee hereof and incorporated herein by reference in its entirety.

FIELD OF THE DISCLOSURE

The present disclosure is directed to a measurement while drilling (MWD) tool. More specifically, but without limitation, this invention relates to an improved MWD apparatus and system for drilling unconventional wells, particularly on land.

BACKGROUND

Operators drill wells many thousands of feet in the search for hydrocarbons. The wells are expensive and take a significant amount of time to plan. To obtain hydrocarbons such as oil and gas, boreholes are drilled by rotating a drill bit attached to a drill string. The drill bit is typically mounted on the lower end of the drill string as part of a bottom-hole assembly (BHA) and is rotated by rotating the drill string at the surface and/or by actuation of down-hole motors or turbines.

Operators find it important to obtain data about the various subterranean reservoirs once the actual drilling begins. Thus, measurement while drilling (MWD) tools have been developed that gather information about the subterranean reservoirs and telemetry the data to the surface. A variety of sensors employed in the drill string are used to monitor various down-hole conditions, such as pressure, spatial orientation, temperature, or gamma ray count, that are encountered while drilling. Engineers and geologist can then use this data in an effort to understand the formations and make plans on completion, sidetracking, abandoning, further drilling, etc.

The use of sensors during the drilling operation to provide information related to positioning or steering the drill, such as direction, orientation and drill bit information, is referred to as "Measurement While Drilling" (MWD). The phrase "Logging While Drilling" (LWD) is often used to using sensors for petrophysical or geological measurements during drilling. As used herein, "MWD" will also be used to encompass LWD applications unless otherwise specified.

Most of the existing MWD systems were developed for drilling directional wells through clastic or carbonate reservoirs and are not well suited for drilling unconventional drilling programs, which are typically characterized by long, deviated laterals and which require advanced hydraulic fracturing for production. The problems with existing MWD systems are associated with measurement accuracy, measurement type, BHA incompatibility, and cost-effectiveness.

What is needed is an improved MWD system specifically designed for geosteering in unconventional wells.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

Embodiments of the present invention are directed at an improved MWD system for drilling unconventional wells, particularly on land. Particular embodiments provide more accurate well bore placement, which includes directional drilling and geosteering, greater drilling efficiency, and improved interfacing into automation systems such as automated top drives and Managed Pressure Drilling (MPD) systems. A MWD system according to embodiments of the invention is designed to fit the existing cost structure associated with drilling unconventional reservoirs on land. In some embodiments, the inventive system eliminates the need for dedicated MWD personnel at the wellsite thereby enabling remote directional drilling and also drilling automation. The measurements provided by the MWD system are focused on providing the information required for more precise wellbore placement, drilling dynamics for drilling efficiency, annulus pressure to assist with MPD, and formation measurements for geosteering. In particular embodiments, the BHA sensor assembly is substantially shorter and more compact than in prior art systems, which makes it easy to place in the bottom-hole assembly and which also can improve directional drilling and geosteering by placing the sensors closer to the drill bit.

Figure 1:
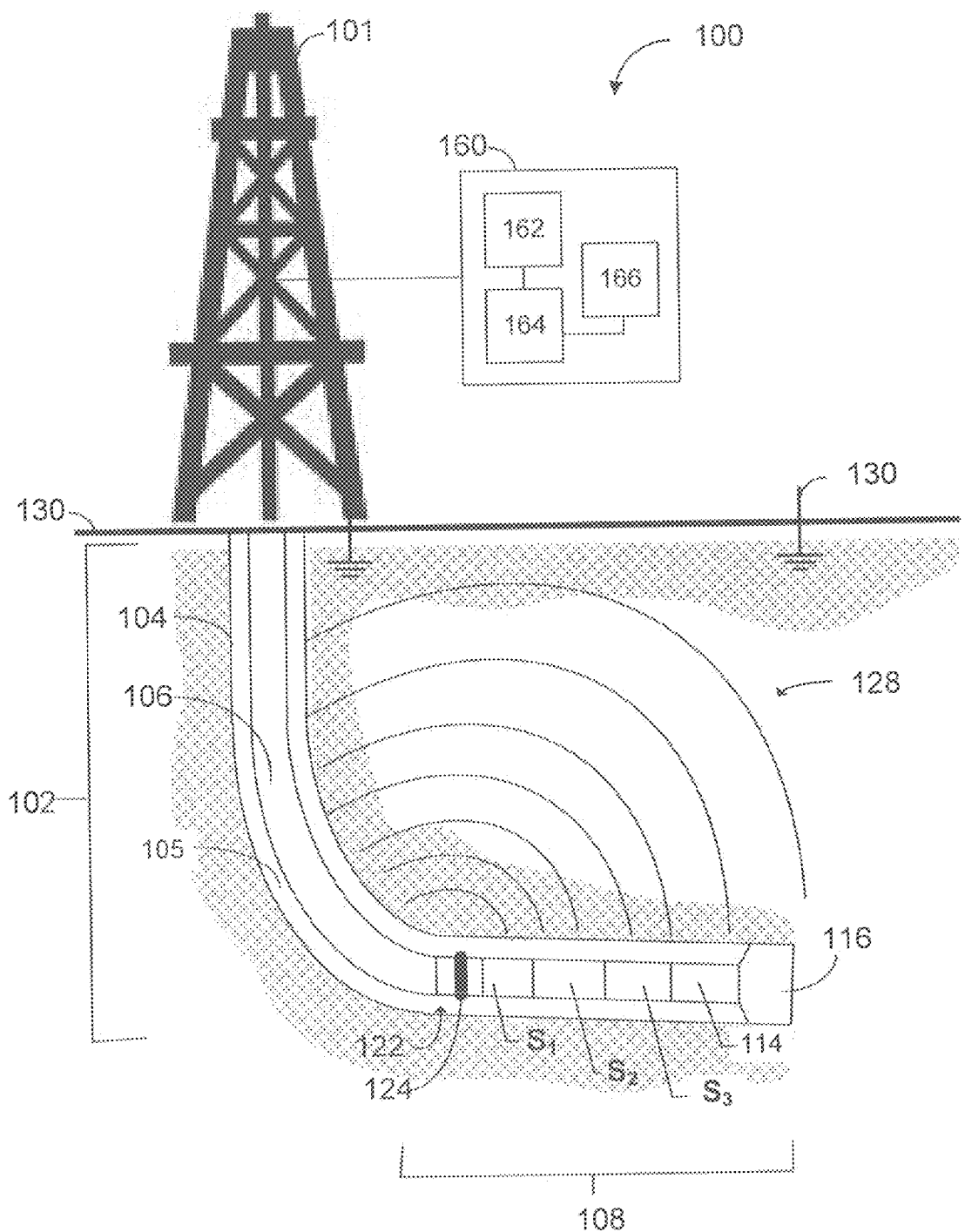
FIG. 1 is a schematic drawing of a prior art drilling system using EM telemetry.

FIG. 1 is a simplified schematic illustration of a drilling system 100 that can be used in unconventional drilling operations such as horizontal drilling according to embodiments of the invention. A derrick 101 supports and rotates the drill string 102 in order to actually drill the well. The terms well, wellbore, and borehole are used herein as synonyms. The drill string 102, which is suspended within the borehole 104 once drilling is commenced, comprises a number of tubular sections connected together, with a drill bit 116 attached at the bottom of the drill string. The lowest part of the drill string, extending from the drill bit to the drill pipe, is referred to as the bottom-hole assembly ("BHA") 108. As used herein, terms such as "top," "up," "upper," "upwardly," or "upstream" will mean toward the surface of the well and terms such as "bottom," "down," "lower," "downwardly," or "downstream" will mean toward the terminal end of the well, regardless of the well-bore orientation.

A typical BHA can include the drill bit, a mud motor, a BHA sensor assembly (including MWD and LWD components), various connectors and subs, and a number of heavy weight drill collars (pipes) used to apply weight to the bit. The length of a conventional BHA assembly, including the number of heavy collars, can be from about 200 to about 400 feet.

A rotary table or a top drive (not shown) coupled to the drill string 102 may be utilized to rotate the drill string 102 at the surface to rotate the BHA 108 and thus the drill bit 116 to drill the borehole 104. A drilling motor 114 (also referred to as "mud motors") may also be provided to help rotate the drill bit. To operate the mud motor, a drilling fluid (often referred to as mud) from a source 170 is pumped under pressure into the drill pipe 106. The drilling fluid passes through flow bores throughout the length of the BHA and discharges at the bottom of the drill bit 116. The mud flow returns to the surface via the annular space 105 (also referred as the "annulus") between the drill string 102 and the inside wall of the borehole 104.

Figure 2:
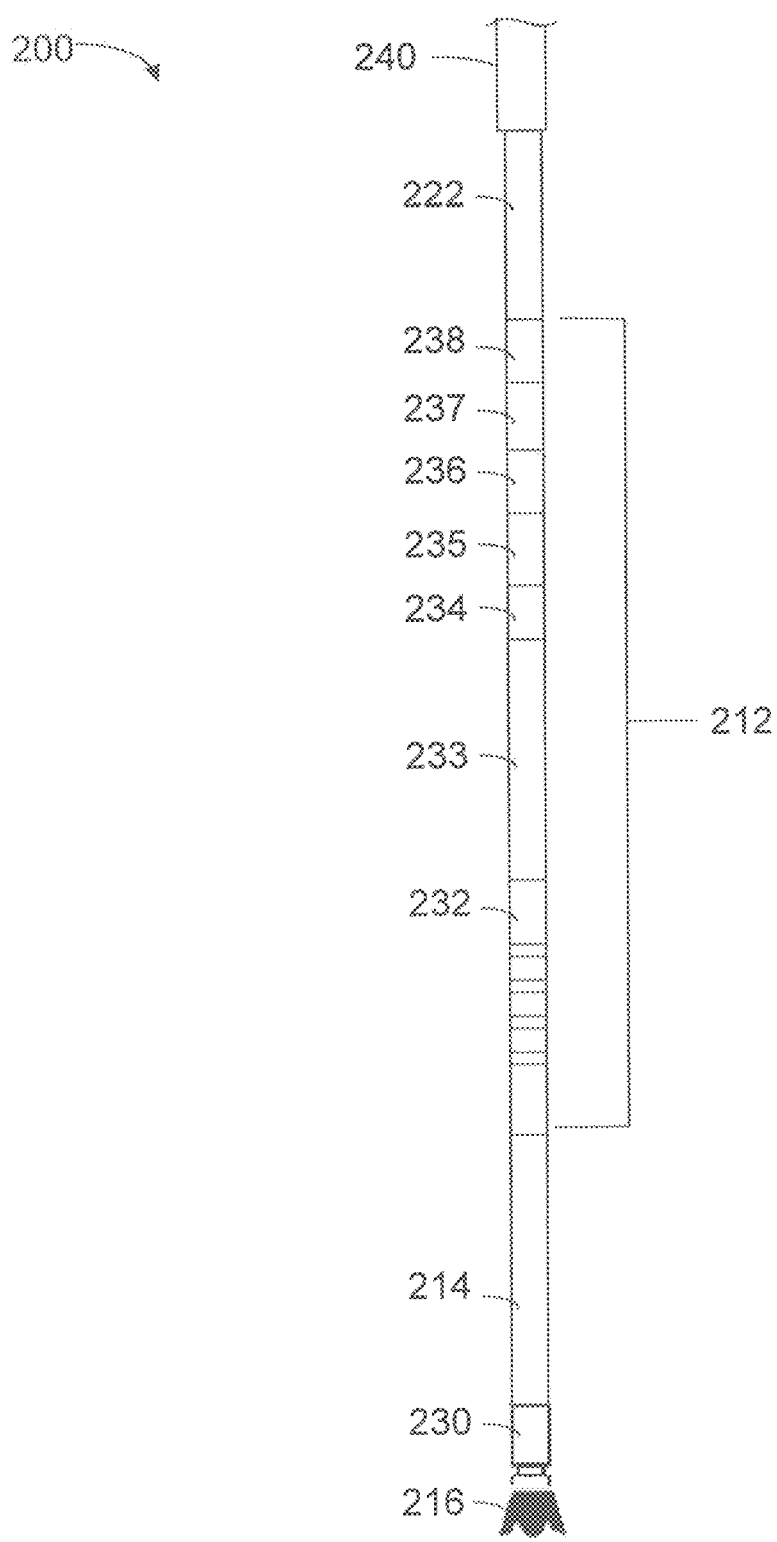
FIG. 2 is a schematic drawing of a conventional BHA.

The BHA can also include one or more MWD and/or LWD sensors $S_1$, $S_2$, $S_3$ and related circuitry for measuring or determining one or more parameters relating to a formation being drilled. Referring also to FIG. 2, a typical BHA may include sensors for measuring direction and inclination; azimuthal gamma ray detection; determining bore and annular pressure, temperature, and vibration/dynamics; determining wave propagation resistivity; and/or making rotary directional surveys. Non-limiting examples of other sensor types that can be included in the BHA include sensors for determination of formation parameters (such as resistivity, dielectric constant, water saturation, porosity, density and permeability), measuring borehole parameters (such as borehole size and borehole roughness), measuring geophysical parameters (such as acoustic velocity and acoustic travel time), measuring borehole fluid parameters (such as viscosity, density, clarity, rheology, pH level, and gas, oil and water contents), determining boundary conditions, and/or measuring physical and chemical properties of the borehole fluid.

In the drilling system of FIG. 1, BHA 108 also includes a telemetry system that processes signals from the LWD and MWD sensors and transmits data to the surface. The LWD and MWD sensors and/or other portions of the BHA may also have the ability to store measurements for later retrieval. Data transmission methods may include, for example, digitally encoding data and transmitting the encoded data to the surface, possibly as pressure pulses in the drilling fluid or mud system, acoustic transmission through the drill string, electronic transmission through a wireline or wired pipe, and/or transmission as electromagnetic (EM) pulses. The exemplary drilling system shown in FIG. 1 uses EM telemetry to transmit LWD/MWD data to the surface.

The EM telemetry system can be coupled to a drill pipe at its upper end and to the sensors and drilling systems of the BHA at its lower end. The EM telemetry system includes an electrically insulating connector, referred to as a gap sub 122, that insulates the upper part of the drill string (above the gap sub) from the lower portion of the drill string (below the gap sub) to form a dipole antenna. An EM transmitter and associated electronics (not shown) gather and encode the data from the various sensors onto an EM carrier wave 128 electrically produced across the electrical break 124 caused by gap sub 122 disposed between the upper and lower sections of the drill string. The EM carrier wave travels through the earth, allowing a potential difference to be measured between the derrick 101 and a surface antenna 130 located some distance away. The EM carrier wave can then be amplified and decoded to reproduce the data from the BHA sensors.

A control unit (or controller) 160, which may be a computer-based unit, may be placed at the surface 130 for receiving and processing data transmitted by the sensors in the drill bit and other sensors in the drilling assembly 130 and for controlling selected operations of the various devices and sensors in the BHA 108. The surface controller 160, in one embodiment, may include a processor 162, a data storage device (or a computer-readable medium) 164 for storing data and computer programs 166. The data storage device 164 may be any suitable device, including, but not limited to, a read-only memory (ROM), a random-access memory (RAM), a flash memory, a magnetic tape, a hard disc and an optical disk.

FIG. 2 shows a schematic view of a prior-art bottom hole assembly (BHA) 200, which is attached to the drill pipe 201. BHA 200 includes a drill bit 216, a steerable assembly 230, a down hole motor 214, a sensor assembly 212, and several hundred feet of heavy drill collar sections 240. BHA sensor assembly includes a resistivity sensor 232, such as a propagation resistivity measurement sensor, a gamma ray sensor 233, a directional sensor 234, a tension/compression sub 235, a pressure/temperature sub 236, a circulation sub 237, and a weight on bit sensor 238. These and other components found in existing BHAs are typically arranged in a number of separate modules, which allows a driller to combine sensors/components from different manufacturers.

Figure 3A:
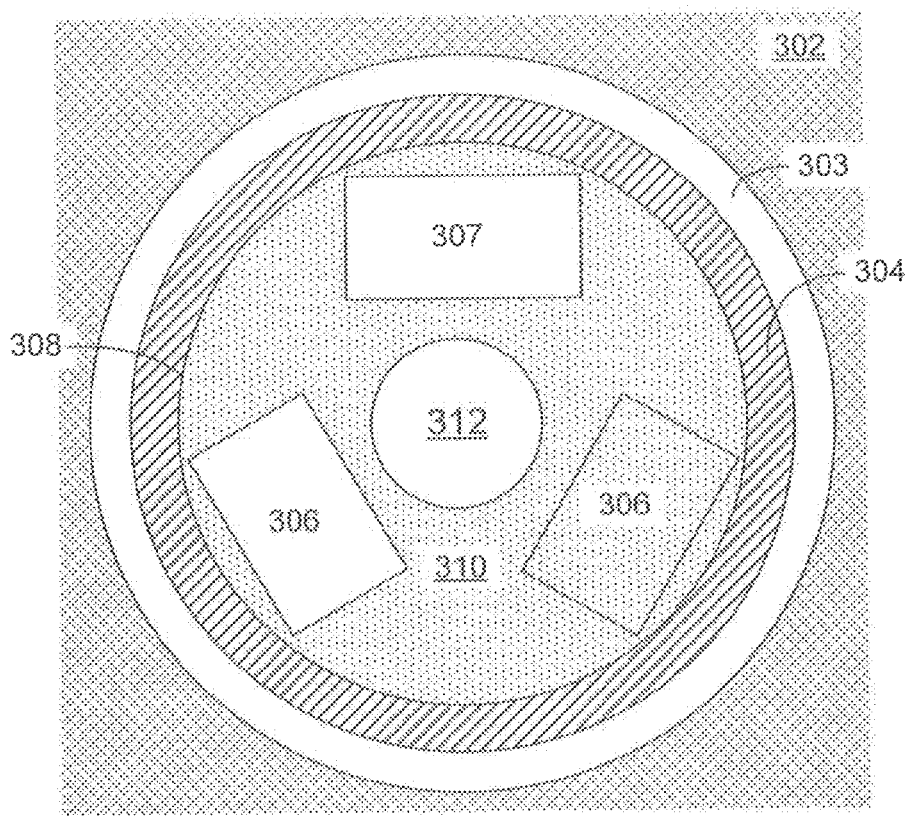
FIG. 3A shows an axial cross section of a conventional collar mounted system.
Figure 3B:
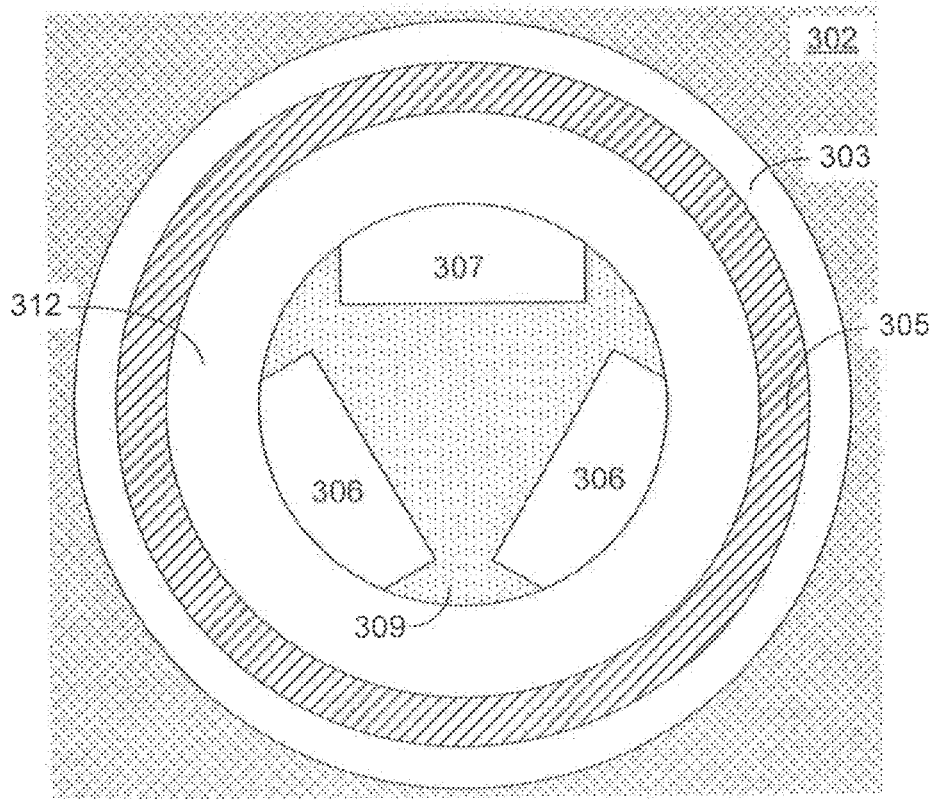
FIG. 3B shows an axial cross section of a conventional probe mounted system.

The sensor modules themselves are typically either collar mounted systems or probe mounted systems. FIG. 3A shows an axial cross section of a collar mounted system within a bore hole. Fluid is pumped downhole through a concentric flow bore 312 and returns up to the surface through annulus 303. Such a system makes use of a dedicated drill collar 304, with the sensors 306 and electronics 307 either mounted or attached directly to and within the drill collar or contained within an annular housing 310 formed between the inner surface of the drill collar outer wall and central flow bore 312. 3B shows an axial cross section of a probe mounted system in which the sensors 306 and electronics 307 are fitted inside a protective housing to form a probe or sonde 309 that is placed inside a standard drill collar 305 (usually a non-magnetic drill collar). Fluid is pumped downhole through mud flow annular space 312 surrounding the probe 309 and returns up to the surface through outer annulus 303.

In order for different component/sensor assemblies to be truly modular, each must be able to be used either alone, or in conjunction with other component/sensor assemblies. As a result, a conventional modular component/sensor assembly will contain its own controllers, including any necessary processors, memory, or control circuitry, and batteries (or other power supply). Although the exact lengths vary, most conventional modular component/sensor assemblies are approximately the same length as a standard drill collar section or about 31 feet. Thus, in a conventional BHA such as the one shown in FIG. 2, the sensor assembly 212 alone can be as long as 120 feet in length.

Many drilling practices that have been accepted and practiced worldwide for years may not be considered best practices for unconventional drilling applications. The challenge remains to be able make informed decisions on changes to drilling practices and parameters based on real downhole data. For unconventional wells having long horizontal runs, measurements of RPM, WOB and TOB at the surface are not necessarily good indications of what is actually occurring downhole. Although these measurements have been available for decades they are rarely run in the land environment as they cannot be provided at a low enough cost by the service companies. Additionally the challenge remains in developing a system that can take the downhole drilling dynamics data and present it in a fashion whereby decisions can be made in real time.

In order to drill an unconventional well, an operator must be able to control drill placement accurately, while maintaining high rates of penetration and minimizing hole tortuosity and while keeping costs to a minimum. In order to achieve these goals, accurate knowledge of bit position relative to surface and formation along with maximization of bottom hole power is required. Increased reliability of the BHA is also highly desirable to reduce costs of operation by reducing equipment non-productive time (NPT).

Applicants have discovered that one significant element of a more cost-effective and reliable MWD system for unconventional wells is reduced modularity in the BHA. This runs counter to prevailing practice in the industry where modularity is thought to be highly advantageous. In contrast to the prior art, Applicants have determined that the benefits of modularity are more than offset by lower costs and increased reliability of completely or substantially non-modular BHAs.

One of the biggest contributors to cost of ownership for MWD drilling equipment is system length. Typical prior-art MWD systems are manufactured using expensive nonmagnetic materials such as beryllium copper and austenitic steels, which means that increased length equals increased capital cost. Additionally, increased length typically requires additional electromechanical connectors, which add to system cost and complexity. Particular embodiments of the invention minimize modularity by separating wearable parts (parts requiring regular maintenance such as battery replacement) from long-life parts (sensors and electronics). This allows for a reduction in BHA sensor assembly length because long-life parts can be safely combined into one section. The inclusion of only sensors specifically needed for unconventional wells, as described below, allows the particular combination of sensors to be combined into the shortest possible length. Preferably, the overall length of the BHA components in a MWD system will be less than 90 ft, less than 75 ft., less than 60 ft., less than 40 ft. (12.1 m), less than 35 ft. (10.7 m), less than 33 ft. (10.1 m), less than 31 ft. (9.4 m), or less than 30 ft. (9.1 m).

Figure 4A:
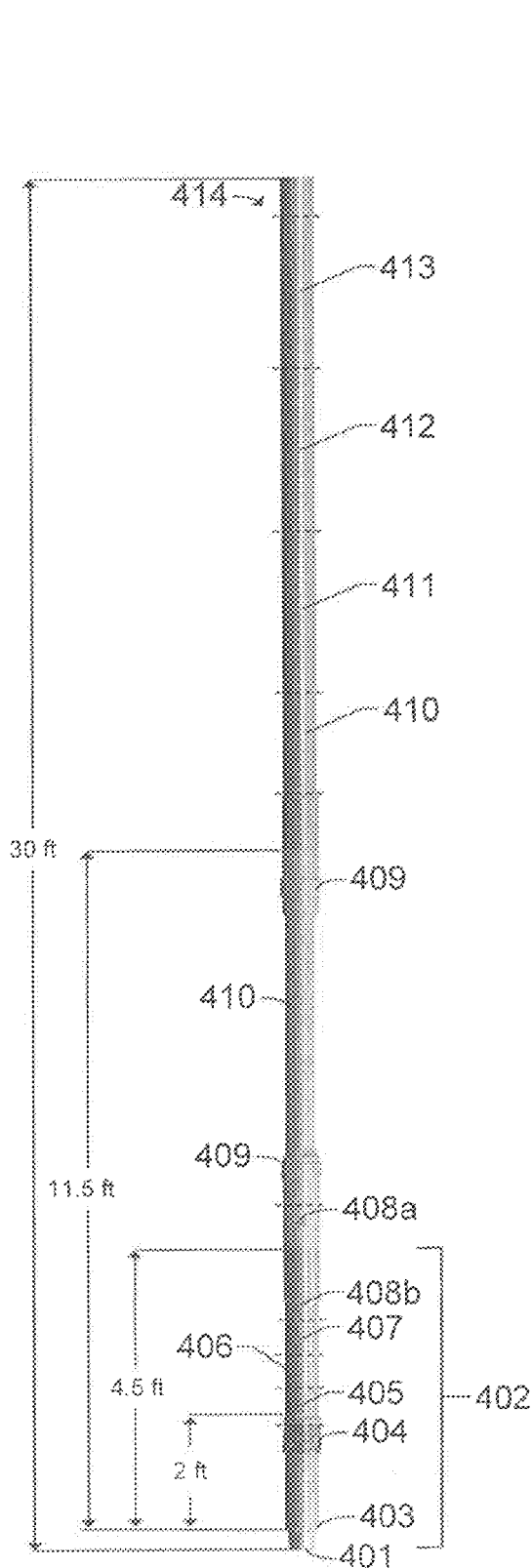
FIG. 4A is a schematic drawing of a BHA sensor assembly according to embodiments of the present invention that also incorporates a novel combination and placement of sensors measuring drilling dynamics, rotary inclination, azimuthal gamma and dual pressure measurements.
Figure 4B:
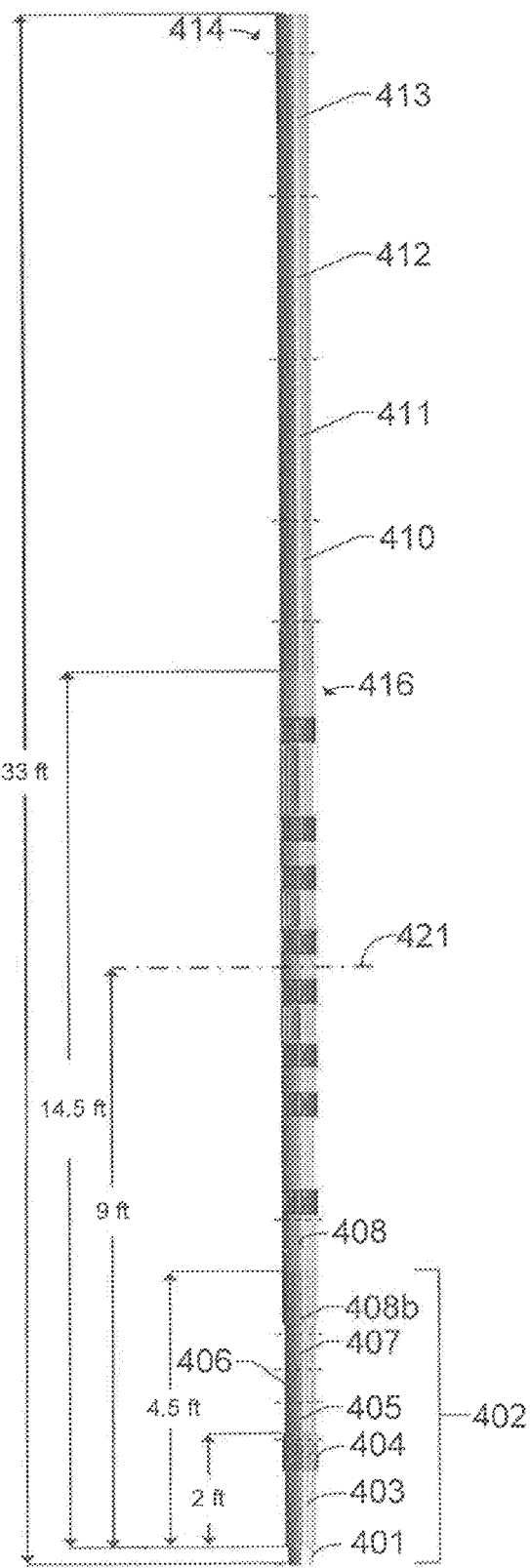
FIG. 4B is a schematic drawing of a BHA sensor assembly according to other embodiments of the present invention that includes the sensors of the BHA sensor assembly of FIG. 4A combined with a compensated triple transmitter dual receiver propagation resistivity sensor.

Applicants have also realized that the ability to place the wellbore precisely within the geological model developed by the operator is especially significant in unconventional drilling applications. Accordingly, embodiments of the present invention make use of a novel combination and placement of sensors to greatly improve wellbore positioning. FIG. 4A is a schematic drawing of a BHA sensor assembly according to embodiments of the present invention that also incorporates a novel combination and placement of sensors measuring drilling dynamics, rotary inclination, azimuthal gamma and dual pressure measurements. FIG. 4B is a schematic drawing of a BHA sensor assembly according to other embodiments of the present invention that includes the sensors of the BHA sensor assembly of FIG. 4A combined with a compensated triple transmitter dual receiver propagation resistivity sensor. The sensor assemblies of FIGS. 4A and 4B are collar mounted systems, although probe mounted systems, or even a combination of collar mounted and probe mounted sections, could be used in other embodiments. In some embodiments, the flow bore may be deviated from the central axis for at least a portion of the length of the sensor assembly to provide sufficient space for sensors, circuitry, or other components. The downhole fluid flow may also be through an annulus for at least a portion of the sensor assembly, with a central housing containing one or more components. In some embodiments, at least one of the sensor assembly sections comprises a pressure sealed housing that maintains electronic cavities at atmospheric pressure.

The BHA sensor assembly of FIG. 4A comprises three tubular sections 402, 410, and 414 that can be attached together, for example, by way of conventional pin connections 401 at the top and bottom of each section. In the figures and descriptions herein, the tubular sections as generally shown or described as cylindrical in shape with concentric outer and inner diameters. In some embodiments, however, the tubular members may be any shape necessary to accommodate the internal components and operating conditions, including, for example, having non-circular cross-sections, such as square, rectangular, or elliptical, or even having a spiral shape.

A MWD system according to embodiments of the present invention provides a particular combination of sensors in a specific arrangement in order to provide a system expressly designed for drilling unconventional wells. By minimizing modularity and including only sensors specifically needed for unconventional wells, sensors and associated electronics can be more efficiently combined into a BHA sensor assembly having the shortest possible length. Lower tubular 402 houses a particular combination of sensors for use in drilling unconditional wells. Long-life parts such as the sensors themselves can be safely combined into one section of the assembly, while parts requiring regular maintenance such as batteries and transmitter components are included in separate upper tubular 414 of the assembly. As described below, controllers and associated circuitry necessary for sensor and general drilling operation can also be separated from the actual sensor sections to allow for some customization in the exact sensors included in a BHA sensor assembly, while still eliminating the need for multiple controllers and processors as in more conventional modular systems.

A BHA sensor assembly according to particular embodiments includes highly accurate and precise tri-axial accelerometers to measure inclination and tri-axial magnetometer packages to measure direction (Azimuth). Precise wellbore positioning of a horizontal well requires not only accurate sensors but also changes in the placement of the sensors. The closer positioning sensors are located to the drill bit, the more useful and accurate the measurements will be. In particular embodiments, the sensors for inclination measurements are located at the lowest point in the BHA sensor assembly (nearest the drill bit). In particular embodiments, lower tubular 402 houses an inclination sensor as close to the bottom of the BHA sensor assembly as possible. As is known in the art, a few feet at the top and bottom of each collar should be kept free of electronics and circuitry to accommodate damage during operation and cutbacks to repair damaged pin connections. Accordingly, in the embodiment of FIG. 4A, an inclination sensor is housed within tubular 402 in the section indicated by reference number 405, with the sensor reading being taken at a point that is about 2 feet above the shoulder 403. Screw-on wear collar 404 can be used to protect tubular 402 from damage due to contact with the sides of the wellbore.

Wellbore position calculations are typically performed by measuring Azimuth and Inclination at 10 to 30 meter intervals and using interpolation techniques to determine the borehole position between the survey stations. Applicants have recognized that increased frequency of surveys greatly improves the accuracy of wellbore placement. Measuring and transmitting inclination surveys continuously, and in close proximity to the bit as discussed above, has also proven to be particularly advantageous. Testing by Applicants has confirmed that there can be significant changes in borehole inclination between survey points located tens of meters apart, and if these changes are unaccounted for in determining wellbore position, the final geological interpretation will be in error. Accordingly, embodiments of the invention make use of continuous inclination measurement during drilling.

Particular embodiments of the invention also incorporate an azimuthal gamma imaging system. Gamma imaging is an advantageous capability for a MWD system for drilling unconventional wells. Because gamma rays produced by different isotopes have characteristic energy spectra, gamma imaging can be used to identify various geological formations. Azimuthal gamma-ray sensors can be used to direct steerable drilling assemblies based upon gamma ray measurements.

Normally, gamma measurements in a particular geological formation are azimuthally uniform because such a formation consists mostly of one material, such as sandstone, throughout which the gamma ray emitting materials are more or less uniformly distributed. Thus, one method of maintaining a drilling path inside a particular geological formation or "pay zone" is to continually monitor the azimuthal directions of gamma ray emissions proximate to the steerable drilling assembly. As the drilling assembly nears a bed boundary, a directional gamma ray detector will sense a variation in gamma measurements as a function of the azimuthal orientation because the material in the adjacent strata will emit gamma particles at a different rate from the pay zone. Once the variation is detected and its location is established, the drilling path can be adjusted to avoid exiting the pay zone.

In particular embodiments, a preferred gamma imaging system will satisfy very tight mechanical constraints to help reduce the overall size and length of the BHA sensor assembly. Because gamma imaging is useful for geosteering, it is also advantageous to place the gamma sensors close to the bottom of the BHA sensor assembly (and close to the drill bit). Accordingly, in the embodiment of FIG. 3A, a gamma sensor assembly is housed within tubular 302 in the section indicated by reference number 306, immediately above the inclination sensor, with the gamma sensor readings being taken at a point that is about 3 feet above the shoulder 303.

Figure 5:
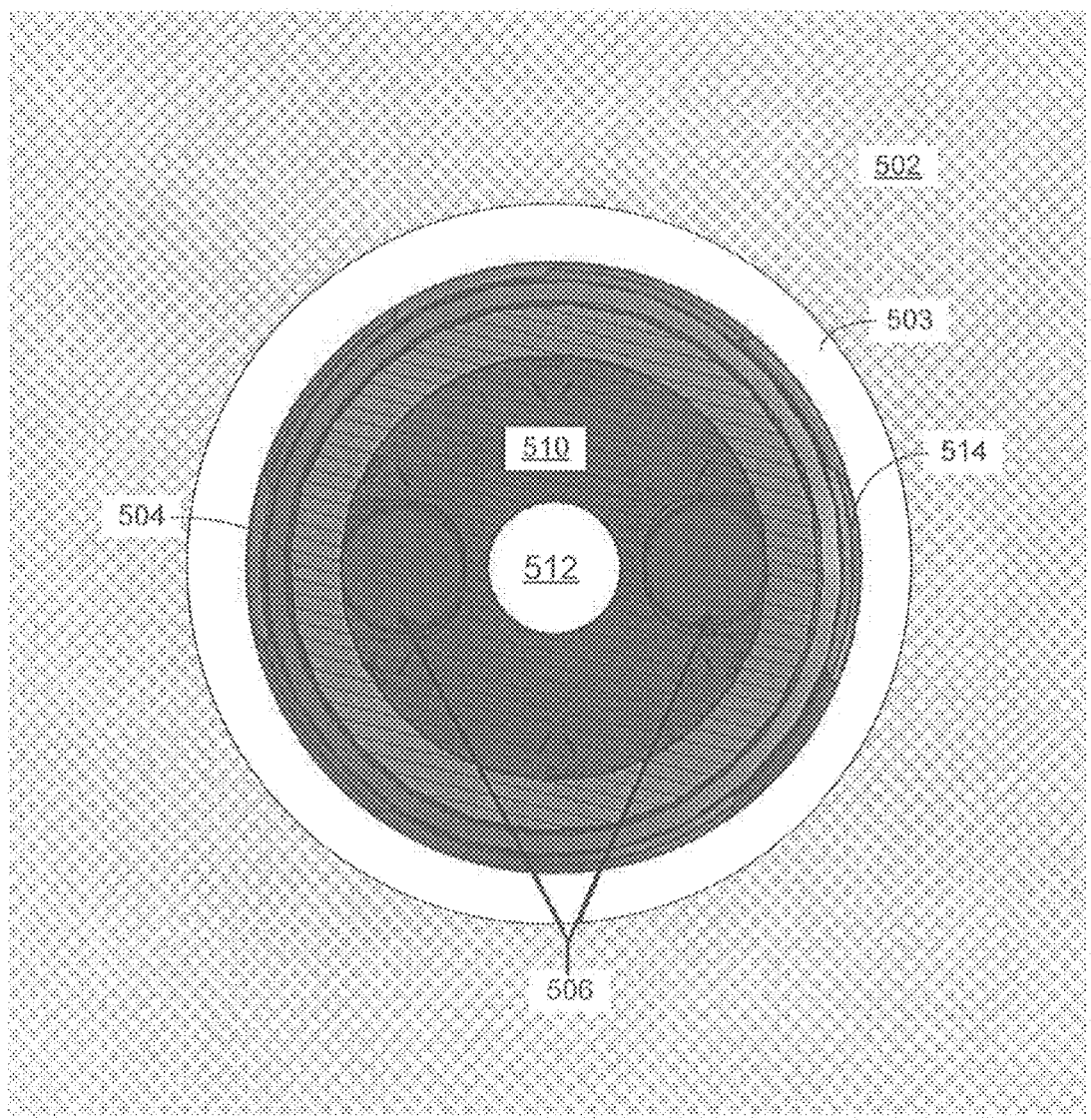
FIG. 5 is a cross section of a BHA sensor assembly according to embodiments of the invention showing two gamma detectors, each oriented 180° opposite to the other.

Preferred gamma imaging systems also maximize the counting efficiency of the system, which is especially important for a statistical measurement system such as gamma imaging. In a typical prior art system, gamma detectors are centrally mounted within the BHA sensor assembly so that the detector is along the central longitudinal axis of the cylindrical BHA sensor assembly casing. Applicants have determined that for unconventional/horizontal drilling applications, it can be advantageous to for the gamma imaging signal to be mounted off-axis in order to obtain the highest azimuthal sensitivity and thereby the highest quality image data. FIG. 5 is an axial cross section of a BHA sensor assembly according to embodiments of the invention in which two separate off-axis gamma detectors 504 are positioned 180° opposed to each other, resulting in increased gamma counts. In the embodiment of FIG. 5, the sensor assembly is a collar mounted system, including dedicated drill collar 504 with the sensors and electronics (not shown) contained within an annular housing 510 formed between the inner surface of the drill collar outer wall and central flow bore 512.

In some embodiments, additional sensors are also included in the BHA sensor assembly. In a non-limiting example, sensors for the measurement of annulus pressure (aP) and interior fluid pressure could also be included in the BHA sensor assembly. A downhole annular pressure sensor may be configured to detect the downhole pressure of the fluid returning to the surface in the annulus-shaped region defined between the external surface of the BHA sensor assembly and the internal diameter of the wellbore. These measurements may include both static annular pressure (pumps off) and active annular pressure (pumps on). One or more additional sensors can be used to measure the pressure of the fluid pumped down through the center of the drill string. In the embodiment of FIG. 4A, pressure sensors can be located within tubular 402 in the section indicated by reference number 407, with the annular pressure measured at one or more exterior ports.

There are numerous applications and benefits for measuring pressure downhole while drilling. Measurement of aP allows the formation fracture during drilling operations to be more adequately controlled and managed. Pressure drilling can also be improved to allow for operation in more restrictive zones.

With the advent of Managed Pressure Drilling MPD systems the need for an accurate measurement of annulus pressure to determine ECD (Equivalent Circulating Density) has increased significantly. In an MPD application, the aP measurement is used to calibrate models and has proven to be beneficial in early kick detection. Even on wells that are not using an MPD system understanding ECD while drilling is critical. When drilling a horizontal well, ensuring proper hole cleaning is of prime importance because the buildup of rock cuttings around the drill bit and BHA can cause drilling inefficiencies including slowing or even stopping the drill string rotation. This type of rock cutting buildup, as well as other drilling inefficiencies, can be detected by monitoring annular pressure. The availability of aP data eliminates the guesswork associated with this process.

Particular embodiments also include sensors measuring drilling dynamics such as near bit weight-on-bit (WOB), torque-on-bit (TOB), and Bend-on-Bit (BOB). In the embodiment of FIG. 4A, WOB, TOB, and BOB can be measured by one or more externally mounted strain gauges 408a. In the embodiment of FIG. 4A, strain gauge 408a is mounted on the outside of central tubular 410, while the sensor electronics are located within the housing of tubular 402 in the area indicated by reference number 408b.

In the embodiment of FIG. 4A, central tubular 410 is a flex collar having a reduced outer diameter portion to allow the BHA sensor assembly to more readily navigate sharp turns or curvature in the wellbore. Central tubular 410 also includes integral wear sleeves 409 above and below the reduced OD portion of the collar. In some embodiments, central tubular 410 also houses wire conduits that, in conjunction with electrical connections at the top and/or the bottom of each included tubular (not shown), electrically couple the sensor components in lower tubular 402 with the electrical components of upper tubular 414. In the embodiment shown in FIG. 4A, central tubular 410 is about 7 feet in length.

In the embodiment of FIG. 4A, a conventional directional sensor can be housed within upper tubular 414 in the area indicated by reference number 410. Additionally, upper tubular 414 can house one or more controllers plus the necessary circuitry to control the operation of the sensors and of the drill operation (311), one or more batteries (312), and a telemetry system for transmitting data to the surface (313). In the embodiment shown in FIG. 4A, the upper tubular 414 is about 18.5 feet in length, resulting in BHA sensor assembly of about 30 feet in total length.

Sensors measuring shock and vibration, and/or revolutions per minute of the bit (RPM) can also be included in some embodiments. Such measurements allow drillers to properly identify conditions and correct unwanted dynamics that lead to BHA failure and hole damage thus minimizing the cost of the well significantly through decreased drilling time by reducing BHA trips, increasing the drilling rate of penetration (ROP), and improved overall well conditions. Adjustment of drilling parameters based upon real-time monitoring of the dynamic loads in the drilling BHA are desirable to help achieve the objective of well bore completion in the shortest possible time.

In some embodiments of the present invention, the combination of the inclination sensors described above and azimuthal gamma imaging alone will be used for geosteering. Applicants have determined that these two sensor types alone will be sufficient for many unconventional wells.

In other embodiments, a resistivity sensor is also included in the BHA sensor assembly as shown in FIG. 4B. Central tubular 410 of FIG. 4A is replaced with a tubular 416 including a resistivity sensor. Tubular 416 also houses wire conduits containing electrical connections between the sensors in lower tubular 402 with the components of upper tubular 414. In the embodiment shown in FIG. 4A, central tubular 410 is about 10 feet in length, resulting in a BHA sensor assembly with an overall length of about 33 feet. The longitudinal midline of the resistivity sensor is about 9 feet from the lower shoulder of the BHA sensor assembly.

In particular embodiments, resistivity sensor 414 is a propagation type resistivity sensor because of the ability of such sensors to work in all fluid types. Resistivity is an electrical property of rocks that indicates the presence of hydrocarbons. This is because most rocks are saturated with low-resistivity water, while oil and gas are very high resistivity. A typical wave propagation resistivity tool provides two resistivity measurements at different depths of investigation. The tool contains two transmitting antenna pairs which are spaced apart from a single receiving antenna pair. An electromagnetic wave from the transmitter travels through the formation to the receiving antennas, and the phase difference (measured in degrees) and amplitude ratio (measured in decibels, relative to air) of the signal are measured and used to determine resistivity. Typical resistivity sensors use measurements at electromagnetic wave frequencies of 2 MHz and 400 kHz and spacings between the transmitting and receiving antennas of approximately 20-25 and approximately 30-35 inches.

Figure 6:
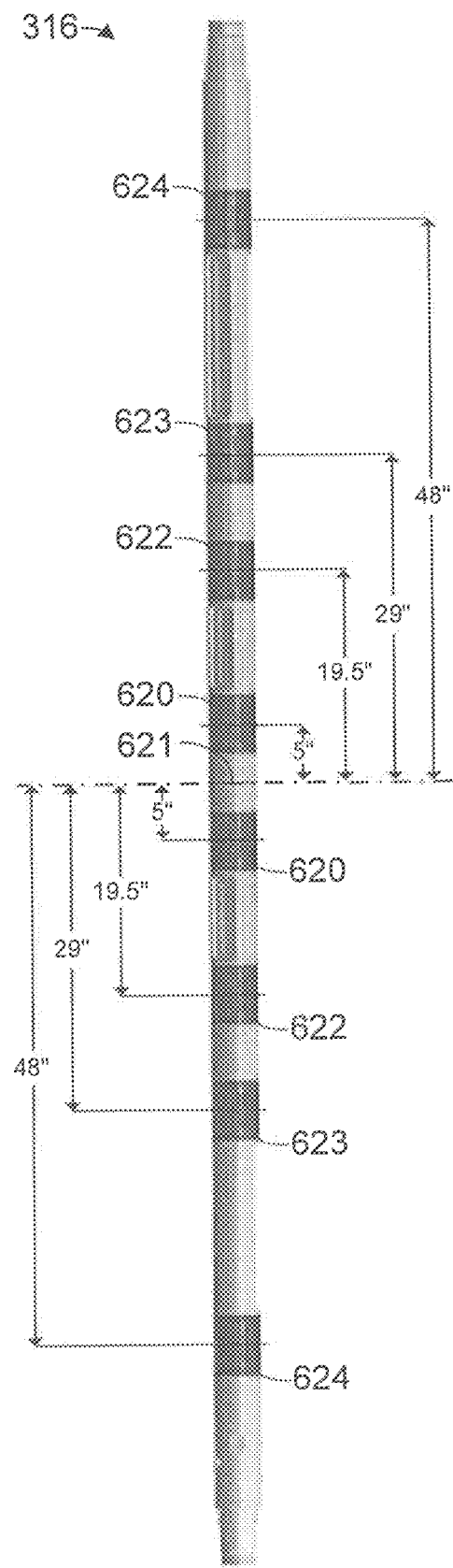
FIG. 6 shows a resistivity sensor included in the BHA sensor assembly of FIG. 4B.

Applicants have discovered that depth of investigation can be of particular significance in a resistivity sensor. In the embodiment of FIG. 4B, central drill pipe 416 houses a propagation type resistivity sensor with three transmitter pairs, as opposed to the two-pair systems typically used. Referring also to FIG. 6, the antennas of resistivity sensor 316 are arranged to form a mirror image about the longitudinal midline of the sensor. Receiving antennas 620 are located about 5 inches from midline 621. Transmitting antenna pairs 622, 623, and 624 are located at different distances from the midline 621. In the embodiment of FIG. 6, the distances between the transmitting antenna pairs and their respective receiving antenna are about 19.5, 29, and 48 inches, respectively. The first two pairs of transmitting antennas 622, 623 are located at distances comparable to conventional resistivity sensors described above. Particular embodiments of the present invention, however, add a third transmitting antenna pair 624 with a longer transmitter-receiver spacing in the range of 46"-50". In the particular embodiment of FIG. 6A, the spacing for the third transmitted pair 624 is about 48". Additionally, measurements at frequencies of 2 MHz and 400 kHz, as in the conventional sensors described above, are combined with measurements using a third, lower frequency of about 100 kHz-150 kHz.

Although the use of longer transmitter-receiver spacing requires the resistivity sensor to be longer than sensors using shorter spacings. Applicants have recognized that such a longer transmitter-receiver coupled with the use of a lower frequency is particularly advantageous for unconventional drilling. The longer path the radio waves travel serves to penetrate deeper into the surrounding earth, which gives a drilling operator an earlier warning that a bed boundary is being approached. Particular embodiments described herein allow the overall length of the BHA sensor assembly to be maintained at a desirable shorter length, even though longer spacings are used.

As described herein, the novel combination of near-bit rotary inclination, azimuthal gamma, and a deep reading resistivity allow well placement to be properly tracked and controlled. This allows an unconventional wellbore to be maintained in proper position relative to formation boundaries, thus maximizing production and minimizing issues during casing, completions, and production.

It is noted that the meaning of the word "measuring," in the context of the present disclosure, may include measuring, detecting, sensing, calculating, and/or otherwise obtaining data. Similarly, the meaning of the word "measure" in the context of the present disclosure may include detect, sense, measure, calculate, and/or otherwise obtain data. The measurements performed by the sensors described herein may be performed once, continuously, periodically, and/or at random intervals. The measurement may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other measurement means may include one or more interfaces which may be local at the well/rig site or located at another, remote location with a network link to the system.

Embodiments of the particular invention are particularly advantageous in the context of drilling automation. The majority of the surface systems today require excessive hardware and personnel to operate. However, an automated drilling process would obviously be very desirable from a cost-saving perspective.

An MWD system plays a pivotal role in drilling automation in that the data acquired from the MWD system is required to automate the overall drilling process. Therefore the goal of reducing/eliminating personnel from the wellsite during the drilling operation must be adhered to when designing an MWD system. Particular embodiments of a MWD system preferably do not require wellsite assembly. A MWD system that is fully assembled and functional in the shop prior to shipment to the wellsite eliminates the need for field personnel to assemble the downhole tool. Assembly of the MWD at a factory or assembly center, rather than under harsh conditions in the field, also reduces the structural dynamic stresses on the printed circuit boards during assembly, which Applicants have discovered leads to significant improvement in reliability under the harsh shock and vibration environment of drilling operations.

In preferred embodiments, a single computer at the wellsite is used to gather all required data and to make that data available through a remote operating center. Single computer operation of the surface equipment reduces complexity and allows for much faster and simpler installation at the wellsite and in some cases may allow the MWD system to travel along with the rig equipment, eliminating the need for per well assembly and disassembly entirely.

In particular embodiments, the MWD system makes use of high-density NAND flash memory, low-power microcontrollers w/ highly integrated peripherals, flexible communication protocols and high-efficiency DC/DC converters. This provides the inventive MWD system with components having lower power consumption and higher reliability operation over a wider temperature range, all in a very condensed footprint as compared to existing MWD systems. Preferred embodiments also make use of components that are rated and qualified to 175° C. to reduce failures at the typical operating temperatures of the MWD components.

The present invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

Embodiments of the present invention are described generally herein in relation to drilling directional wells or unconventional wells, but it should be understood, however, that the methods and the apparatuses described may be equally applicable to other drilling environments. Further, while the descriptions and figures herein show a land-based drilling rig, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

Item 1. A bottom hole assembly (BHA) for use with a downhole measurement-while-drilling (MWD) system for unconventional drilling applications, the BHA comprising:
  a drill bit having a cutting face; and
  a sensor assembly comprising:
    a sensor for measuring inclination, said sensor mounted at the lower end of the BHA adjacent to the drill bit;
    an azimuthal gamma sensor;
    an annular pressure sensor; and
    at least one sensor for measuring drilling dynamics;
  wherein the assembled sensor assembly is less than 60 feet in length, such as less than 40 ft, less than 35 ft, less than 33 ft, or less that 30 ft in length.

Item 2. A downhole measurement-while-drilling (MWD) system for unconventional drilling applications comprising:
  a bottom hole assembly (BHA) comprising:
    a drill bit having a cutting face; and
    a sensor assembly comprising:
      a sensor for measuring inclination and direction, said sensor mounted at the lower end of the BHA adjacent to the drill bit;
      an azimuthal gamma sensor;
      an annular pressure sensor; and
      at least one sensor for measuring drilling dynamics;
    wherein the assembled bottom hole assembly is less than 40 ft, less than 35 ft, less than 33 ft, or less that 30 ft in length.

Item 3. A bottom hole assembly (BHA) for use with a downhole measurement-while-drilling (MWD) system for unconventional drilling applications, the BHA comprising:
  a drill bit having a cutting face; and
  a sensor assembly comprising:
    a sensor for measuring inclination, said sensor mounted at the lower end of the BHA adjacent to the drill bit; and
    an azimuthal gamma sensor;
  wherein the assembled sensor assembly is less than 60 feet in length, such as less than 40 ft, less than 35 ft, less than 33 ft, or less that 30 ft in length.

Item 4. A downhole measurement-while-drilling (MWD) system for unconventional drilling applications comprising:
  a bottom hole assembly (BHA) comprising:
    a drill bit having a cutting face; and
    a sensor assembly comprising:
      a sensor for measuring inclination and direction, said sensor mounted at the lower end of the BHA adjacent to the drill bit;
      an azimuthal gamma sensor; and
    wherein the assembled bottom hole assembly is less than 40 ft, less than 35 ft, less than 33 ft, or less that 30 ft in length.

Item 5. The apparatus of any one of items 4 or 5 in which the BHA further comprises an annular pressure sensor and at least one sensor for measuring drilling dynamics.

Item 6. The apparatus of any one of the preceding items wherein the inclination sensor comprises a tri-axial accelerometer and/or a tri-axial magnetometer.

Item 7. The apparatus of any one of the preceding items in which the inclination sensor is mounted within about 2 feet of the bottom shoulder of the BHA sensor assembly.

Item 8. The apparatus of any one of the preceding items in which the inclination sensor is capable of measuring and transmitting continuously while the drill bit is in use.

Item 9. The apparatus of any one of the preceding items in which the azimuthal gamma sensor comprises two separate gamma detectors mounted on opposite sides of the BHA sensor assembly from each other.

Item 10. The apparatus of any one of the preceding items wherein the azimuthal gamma sensor is mounted within about 3 feet of the bottom shoulder of the BHA sensor assembly.

Item 11. The apparatus of any one items 1-2 or 5-10 in which the annular pressure sensor comprises a dual pressure measurement sensor.

Item 12. The apparatus of any one items 1-2 or 5-11 wherein the annular pressure sensor is mounted within about 4.5 feet of the bottom shoulder of the BHA sensor assembly.

Item 13. The apparatus of any one of items 1-2 or 5-12 in which the at least one sensor for measuring drilling dynamics comprises a sensor for measuring weight-on-bit (WOB), torque-on-bit (TOB), bend, shock and vibration, and/or revolutions per minute of the bit.

Item 14. The apparatus of any one of the preceding items further comprising:
- a battery for providing power to the sensors; and
- a controller and associated circuitry for controlling operation of the sensors and receiving sensor data.

Item 15. The apparatus of item 14 wherein the inclination sensor, the azimuthal gamma sensor, and the annular pressure sensor are all housed in a separate drill collar from the batteries and the controller and associated circuitry.

Item 16. The apparatus of any one of the preceding items further comprising a resistivity sensor.

Item 17. The apparatus of item 16 in which the resistivity sensor is a propagation-type resistivity sensor.

Item 18. The apparatus of any one of items 16-17 in which the resistivity sensor is a multi-frequency wave propagation resistivity sensor which measures resistivity at three different electromagnetic wave frequencies.

Item 19. The apparatus of item 18 in which the three different electromagnetic wave frequencies are about 2 MHz, about 400 kHz, and about 100 kHz to 150 kHz.

Item 20. The apparatus of any one of items 16-19 in which the resistivity sensor is a wave propagation resistivity sensor having a transmitter-receiver spacing of at least about 46" to 48".

Item 21. The apparatus of any one of the preceding items further comprising further comprising a downhole data transmission telemetry device for transmitting data from the BHA sensors to the surface.

Item 22. The apparatus of any one of the preceding items further comprising a surface data transmission telemetry device for receiving, amplifying, and/or decoding transmitted data.

Item 23. The apparatus of item 22 in which the surface data transmission telemetry device is a single computer located at the surface.

Item 24. The apparatus of item 23 in which the single computer located at the surface comprises a processor, a data storage device or a computer-readable medium, one or more computer programs for decoding and/or processing received data and for controlling the operation of the BHA.

Item 25. The apparatus of any one of items 23-24 in which the single computer located at the surface is in communication with one or more remote computers via a network connection so that data from the BHA sensor assembly is available to users at the remote locations.

Item 26. The apparatus of any one of the preceding items in which the BHA can be operated automatically.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A bottom hole assembly (BHA) for use with a downhole measurement-while-drilling (MWD) system for unconventional drilling applications, the BHA comprising:
    a drill bit having a cutting face; and
      a sensor assembly comprising:
    a sensor for measuring inclination, said sensor mounted at the lower end of the BHA adjacent to the drill bit;
    an azimuthal gamma sensor, wherein the azimuthal gamma sensor is mounted within about 3 feet of the lower end of the BHA; and
    an annular pressure sensor mounted within about 4.5 feet of lower end of the BHA,
    wherein the assembled sensor assembly is less than 40 ft in length.

2. The apparatus of claim 1 in which the sensor assembly further comprises an annular pressure sensor and/or at least one sensor for measuring drilling dynamics.

3. The apparatus of claim 1 wherein the sensor for measuring inclination comprises a tri-axial accelerometer and/or a tri-axial magnetometer.

4. The apparatus of claim 3 in which the inclination sensor is capable of measuring and transmitting continuously while the drill bit is in use.

5. The apparatus of claim 3 in which the sensor for measuring inclination is mounted within about 2 feet of the lower end of the BHA.

6. The apparatus of claim 1 in which the azimuthal gamma sensor comprises two separate gamma detectors mounted on opposite sides of the sensor assembly from each other.

7. The apparatus of claim 1 in which the sensor assembly comprises an annular pressure sensor and in which the annular pressure sensor comprises a dual pressure measurement sensor.

8. The apparatus of claim 1 in which the sensor assembly includes at least one sensor for measuring drilling dynamics comprising a sensor for measuring weight-on-bit (WOB), torque-on-bit (TOB), bend, shock and vibration, and/or revolutions per minute of the bit.

9. The apparatus of claim 1 further comprising:
a battery for providing power to the sensors; and
a controller and associated circuitry for controlling operation of the sensors and receiving sensor data.

10. The apparatus of claim 1 further comprising a resistivity sensor.

11. The apparatus of claim 10 in which the resistivity sensor is a multi-frequency wave propagation resistivity sensor which measures resistivity at three different electromagnetic wave frequencies.

12. The apparatus of claim 11 in which the three different electromagnetic wave frequencies are about 2 MHz, about 400 kHz, and about 100 kHz to 150 kHz.

13. The apparatus of claim 10 in which the resistivity sensor is a wave propagation resistivity sensor having a transmitter-receiver spacing of at least about 46" to 48".

14. The apparatus of claim 1 further comprising further comprising a downhole data transmission telemetry device for transmitting data from the BHA sensors to the surface and a surface data transmission telemetry device for receiving, amplifying, and/or decoding transmitted data.

15. The apparatus of claim 14 in which the surface data transmission telemetry device is a single computer located at the surface, said single computer comprising a processor, a data storage device or a computer-readable medium, one or more computer programs for decoding and/or processing received data and for controlling the operation of the BHA.

16. The apparatus of claim 15 in which the single computer located at the surface is in communication with one or more remote computers via a network connection so that data from the BHA sensor assembly is available to users at the remote locations.

* * * * *